(12) United States Patent
Bodey et al.

(10) Patent No.: US 7,600,459 B2
(45) Date of Patent: Oct. 13, 2009

(54) DRIVE MECHANISM AND SLICING APPARATUS FOR FOOD SLICING MACHINE

(75) Inventors: Todd L. Bodey, Springfield, OH (US); Tony L. Thomas, Worthington, OH (US); David J. Petty, Johnstown, OH (US)

(73) Assignee: J. E. Grote Company, Inc., Columbus, OH (US)

( * ) Notice: Subject to any disclaimer, the term of this patent is extended or adjusted under 35 U.S.C. 154(b) by 518 days.

(21) Appl. No.: 11/231,702

(22) Filed: Sep. 21, 2005

(65) Prior Publication Data

US 2007/0062353 A1 Mar. 22, 2007

(51) Int. Cl.
*B23D 53/00* (2006.01)
*B23B 13/08* (2006.01)

(52) U.S. Cl. .......................................... 83/788; 30/380

(58) Field of Classification Search .................... 83/788, 83/145, 437.1, 932, 703, 409.2, 704, 705, 83/409.1, 574, 816, 818, 102.1; 30/380
See application file for complete search history.

(56) References Cited

U.S. PATENT DOCUMENTS

| | | | |
|---|---|---|---|
| 659,088 A | 10/1900 | McKenzie | |
| 1,861,412 A | 5/1932 | Oliver | |
| 1,870,774 A | 8/1932 | Gaines | |
| 1,908,727 A | 5/1933 | Bleam | |
| 2,741,281 A | 4/1956 | Braun | |
| 3,669,163 A | 6/1972 | Crane | |
| 3,760,715 A | 9/1973 | Grote et al. | |
| 4,230,007 A | 10/1980 | Grote et al. | |
| 4,312,253 A | 1/1982 | Johnson et al. | |
| 4,318,322 A | 3/1982 | Russell | |
| 4,372,185 A | 2/1983 | Pila | |
| 4,436,012 A | 3/1984 | Hochanadel | |
| 4,502,184 A * | 3/1985 | Karubian ..................... | 452/160 |
| 4,592,261 A * | 6/1986 | Miyaji et al. ............... | 83/102.1 |
| 4,953,295 A * | 9/1990 | Barradas et al. ............... | 30/380 |
| 5,031,497 A | 7/1991 | Moshier et al. | |
| 5,235,885 A | 8/1993 | Camarena et al. | |
| 5,251,525 A * | 10/1993 | Galloway ..................... | 83/574 |
| 5,784,936 A | 7/1998 | King | |
| 5,906,297 A | 5/1999 | Cole | |
| 6,044,741 A | 4/2000 | Sapp et al. | |
| 6,132,629 A | 10/2000 | Boley | |

(Continued)

FOREIGN PATENT DOCUMENTS

CA          2346839          6/2004

(Continued)

*Primary Examiner*—Ghassem Alie
(74) *Attorney, Agent, or Firm*—Jason H. Foster; Kremblas, Foster, Phillips & Pollick

(57) ABSTRACT

A food slicing machine using a linear servo motor to reciprocate a carriage holding food products through a path that includes a slicing blade. The slicing apparatus is a modular apparatus that can be mounted to and removed from slicing machines as a unit without the need for disassembly of the components of the slicing apparatus. An adjustment mechanism for the blade guide uses two shafts that extend from a bearing plate into a finger that is mounted to the blade guide. The lower shaft has a cam nut that displaces the finger about the upper shaft to bend the blade guide. There is also an adjustment mechanism for the idler pulley of the band blade apparatus.

7 Claims, 11 Drawing Sheets

U.S. PATENT DOCUMENTS 6,461,487 B1 10/2002 Andrews et al.
6,543,325 B1 4/2003 Newhouse et al.

FOREIGN PATENT DOCUMENTS

| DE | 29623179 | 11/1997 |
| EP | 0 965 270 A3 | 4/2001 |
| EP | 1632322 | 3/2006 |
| WO | WO 00/59691 | 10/2000 |
| WO | WO 2004/022110 | 3/2004 |

* cited by examiner

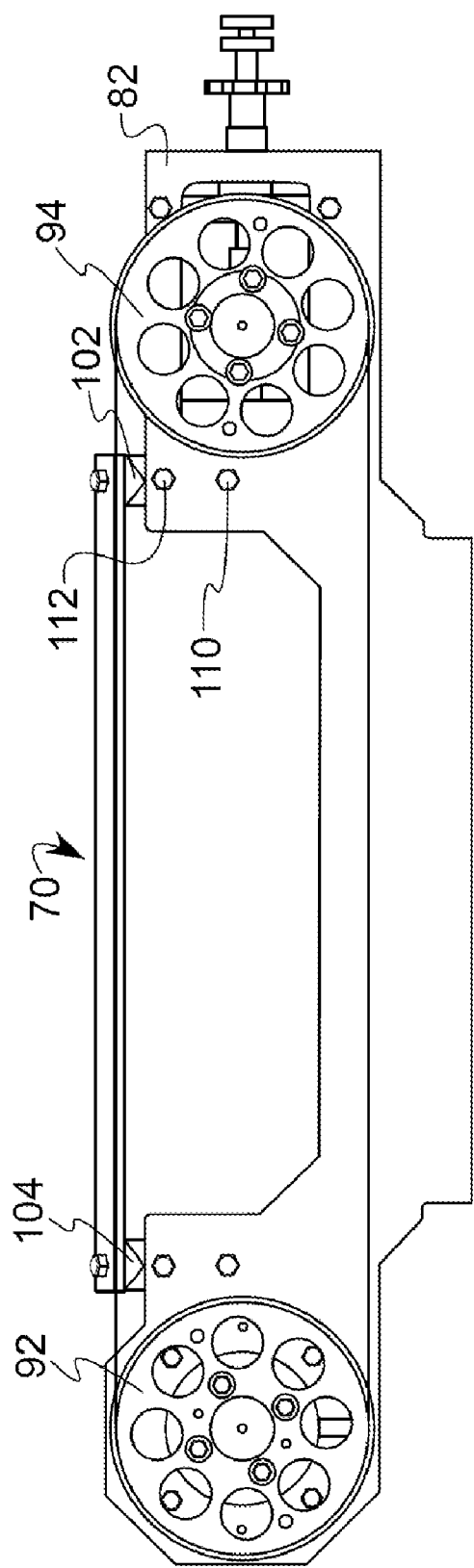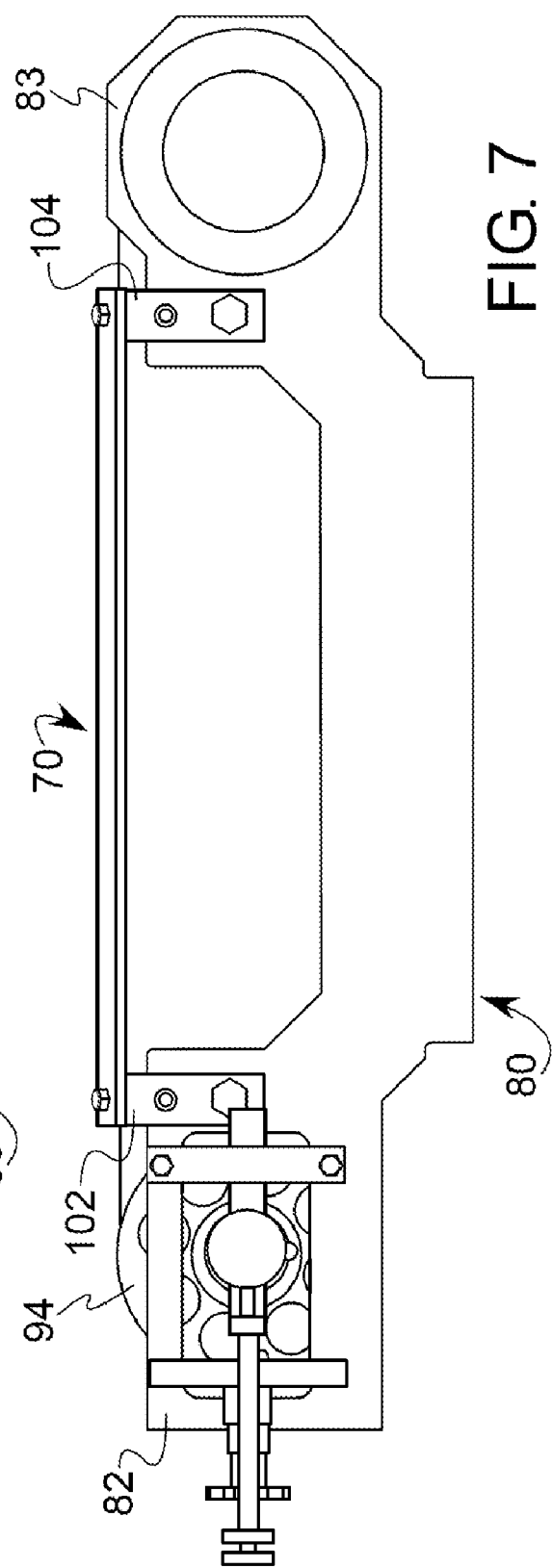

DRIVE MECHANISM AND SLICING APPARATUS FOR FOOD SLICING MACHINE

BACKGROUND OF THE INVENTION

1. Field of the Invention

This invention relates generally to food processing machines, and more specifically to machines that slice food products.

2. Description of the Related Art

It is known that a carriage, in which one or more food products, such as a sausage, can be reciprocated through a path that includes a slicing blade. U.S. Pat. No. 3,760,715 and U.S. Pat. No. 4,230,007 disclose such devices and are incorporated herein by reference. Such machines form slices and permit the slices to fall by gravity toward a conveyor belt beneath the machine. Thus, the slices can be dropped onto substrates, such as pizza crusts, sandwich buns and plates, as the substrates are conveyed beneath parts of the machine.

Typical drive mechanisms for the aforementioned machines include a rotary motor (such as hydraulic, pneumatic or electric) that rotates a belt or chain around a pulley or gear that is connected to the carriage, and linear prime movers, such as hydraulic or pneumatic rams. The drive mechanism commonly extends across a central region of the machine and attaches centrally to the carriage. This prior art configuration has the disadvantage that such drive mechanisms create contaminants, such as dust and lubricant drops, that can fall into the food. In order to avoid this, the drive mechanism must have shields around it. However, such shielding provides numerous horizontal surfaces in the zone above the food substrates and/or slices to collect dust, food particles and other residue of the food processing facility. All surfaces must be cleaned frequently to avoid residue from building up and dropping into the food, but access to the shielded areas is not easily obtained.

The prior art, as exemplified by U.S. Pat. No. 6,044,741, which is incorporated by reference, also teaches to slice food products using a pair of aligned pulleys, one of which is driven by a motor, around which a blade is wound and driven in the manner of a band saw. The apparatus consists of a motor mounted to one side of a food slicing machine, and an idler pulley mounted on the opposite side of the machine. The blade extends around the pulleys and is tightened and tracked by a mechanism that also provides many horizontal surfaces upon which food particles can collect.

Additionally, the blade extends through a blade guide which mounts to the machine's frame and which has a slot through which the blade extends. The blade guide must be adjusted so that its slot is almost perfectly flat in order to obtain uniform slice quality and thickness, and to prevent substantial wear of the blade driven rapidly therethrough. However, adjustment of the blade guide is typically accomplished using shims between two surfaces, which is difficult for anyone other than an accomplished technician to achieve, and is time-consuming even for skilled technicians. Maintaining blade guide configuration throughout the useful life of the machine, which will include numerous blade guide changes, must be achievable without high skill level and time consumption.

Still further, the slicing apparatuses of food slicing machines are often similar along an entire food slicing product line, but must be individually designed for each different food slicing machine.

Therefore, the need exists for a new food slicing machine with an improved drive mechanism, better slicing apparatus, better adjustment of the blade guide and band blade, and fewer surfaces upon which contaminants can collect.

BRIEF SUMMARY OF THE INVENTION

The invention is a food slicing machine having a frame to which a carriage is mounted to hold a food product. The carriage is reciprocatably mounted to move the food product through a slicing path that includes a blade. A linear motor is mounted to the frame near a first side of the carriage, and the motor is drivingly linked to the carriage for drivingly reciprocating the carriage longitudinally relative to the frame. A first horizontal support roller is mounted between the carriage and the frame at a second side of the carriage for restricting lateral movement of the carriage. A first vertical support roller is mounted between the frame and the first side of the carriage. A second vertical support roller is mounted between the frame and a second, opposite side of the carriage. In a preferred embodiment, there are plural horizontal support rollers in pairs on opposite sides of a rib that extends upwardly from the frame.

The invention also contemplates a modular slicing apparatus that can be mounted in the food slicing machine. The slicing apparatus comprises a bearing plate having a first leg member joined to a second leg member by a base, where the leg members and base are all integral in the bearing plate. A rotary motor is mounted to one of the leg members, and a first pulley is drivingly linked to the rotary motor. A second pulley is rotatably mounted to the other leg member. An elongated blade guide is mounted at a first end to the first leg member and at a second end to the second leg member. The blade guide has a longitudinal slot for retaining a continuous loop blade that extends around the first and second pulleys and through the slot in the blade guide. In a preferred embodiment, the bearing plate, the first and second pulleys, the motor, the blade and the blade guide are connected as an operable unit, thereby permitting the slicing apparatus to be attached to or removed from a slicing machine without disassembly of the components of the slicing apparatus.

In a preferred embodiment, the blade guide is adjustable using a mechanism having a first finger member interposed between the first end of the blade guide and the first leg member of the bearing plate. A first shaft, such as a threaded screw shaft, extends from the first leg member to the first finger member. An adjustment shaft extends from the first leg member through an aperture in the first finger member. A cam nut rotatably mounted on the adjustment shaft has an offset lobe inserted into the aperture. The lobe seats against an aperture sidewall and exerts a force against the sidewall upon rotation of the cam nut about the adjustment shaft for rotating the first finger member about the first shaft in order to adjust the straightness of the blade guide.

In a preferred embodiment, the band blade's tension and tracking are adjustable. The second pulley is mounted to an axle that is pivotably mounted to a longitudinally displaceable rod. This axle permits pivoting of the second pulley about a pivot point, which is preferably a screw extending through the axle and the elongated rod. A block is mounted to the bearing plate and has an opening through which the rod extends for limiting lateral movement of the rod. The invention also includes means for displacing the rod longitudinally for adjusting blade tension, and this preferably includes a threaded shaft mounted to a hand-grippable handle. The invention also includes means for pivoting the axle for adjusting blade tracking, and this also preferably includes a threaded shaft mounted to a hand-grippable handle.

BRIEF DESCRIPTION OF THE SEVERAL VIEWS OF THE DRAWINGS

FIG. 6 is a front view illustrating the slicing apparatus.

FIG. 7 is a rear view illustrating the slicing apparatus.

Figure 1:
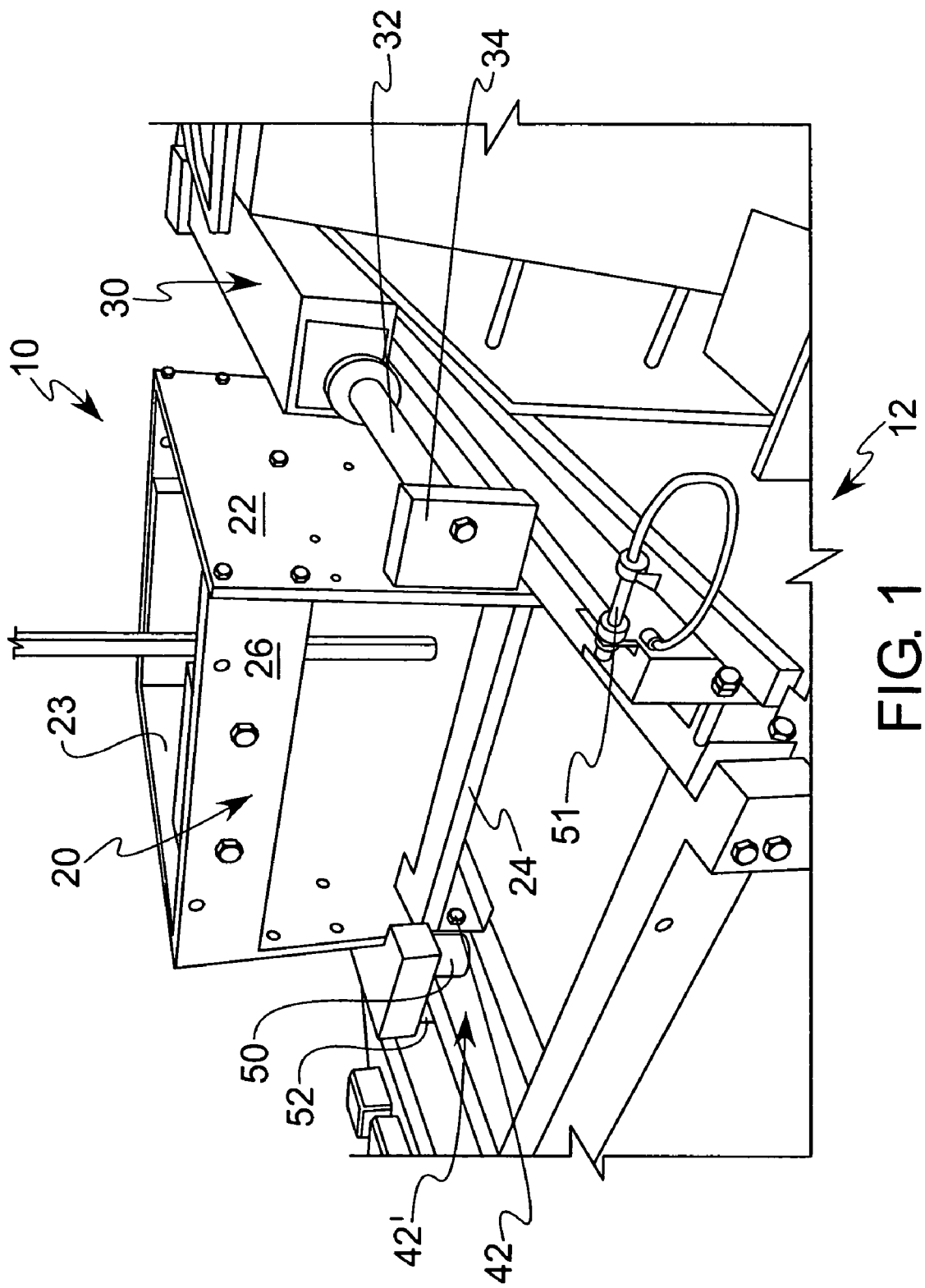
FIG. 1 is a view in perspective illustrating the preferred drive mechanism.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The preferred food slicing machine 10 is shown in FIG. 1 with a carriage 20 reciprocatably mounted to a frame 12. The frame 12 is the rigid structural support for the components of the machine 10. The carriage 20 has opposing sidewalls 22, 23 and a floor member 24, which supports the sidewalls 22, 23. Food products, such as pepperoni logs, are placed between the sidewalls 22, 23 and the floor member 24 during operation. The logs are mounted in a conventional manner in the carriage 20 to be displaced by the carriage 20 through a path that includes a slicing blade, which is preferably mounted below the carriage 20. In the pepperoni log example, the carriage 20 has vertically aligned tubes (not shown) through which the logs extend downwardly so that as the lower end of the carriage 20 is reciprocated above the slicing blade, the downwardly extending logs pass through the blade. As slices are formed during each reciprocation cycle of the carriage 20, the logs are displaced downwardly under the force of gravity so that a new slice can be formed in the next cycle during the next pass through the blade.

The carriage 20 is driven through each cycle by the linear servo motor 30, which has a housing that is rigidly mounted to the frame 12, and a ram 32 that is drivingly linked to the carriage 20, such as by bolting the end of the ram 32 to the plate 34, which is in turn bolted to the carriage 20. The motor 30 is a linear electric servo motor, which is a computer controlled motor that can very accurately control the position, speed, acceleration and other parameters of the carriage 20. The motor 30 can be of the type manufactured by Copley Controls Corp. and Copley Motion Systems, LLC. Of course, any linear motor can be substituted for the preferred linear electric servo motor, with resulting effects that will be understood by a person having ordinary skill.

The motor 30 is preferably located to the side of the carriage 20, and preferably at one side of the frame 12, to avoid being in the food zone where contamination particles might fall onto the food. This also avoids the need for the shielding typically necessary to place around the drive system of a food slicing machine. Still further, this reduces the difficulty in cleaning the machine 10. Of course, the machine 10 can have plural linear motors, such as the motor 30 on one side of the carriage 20 and another substantially identical motor mounted to the opposite side of the carriage 20 in the place of the horizontal rollers 50, 52, 54 and 56. Additionally, in machines having multiple carriages, it is contemplated that linear motors will be positioned to drive the carriages from central positions above food zones.

Figure 2:
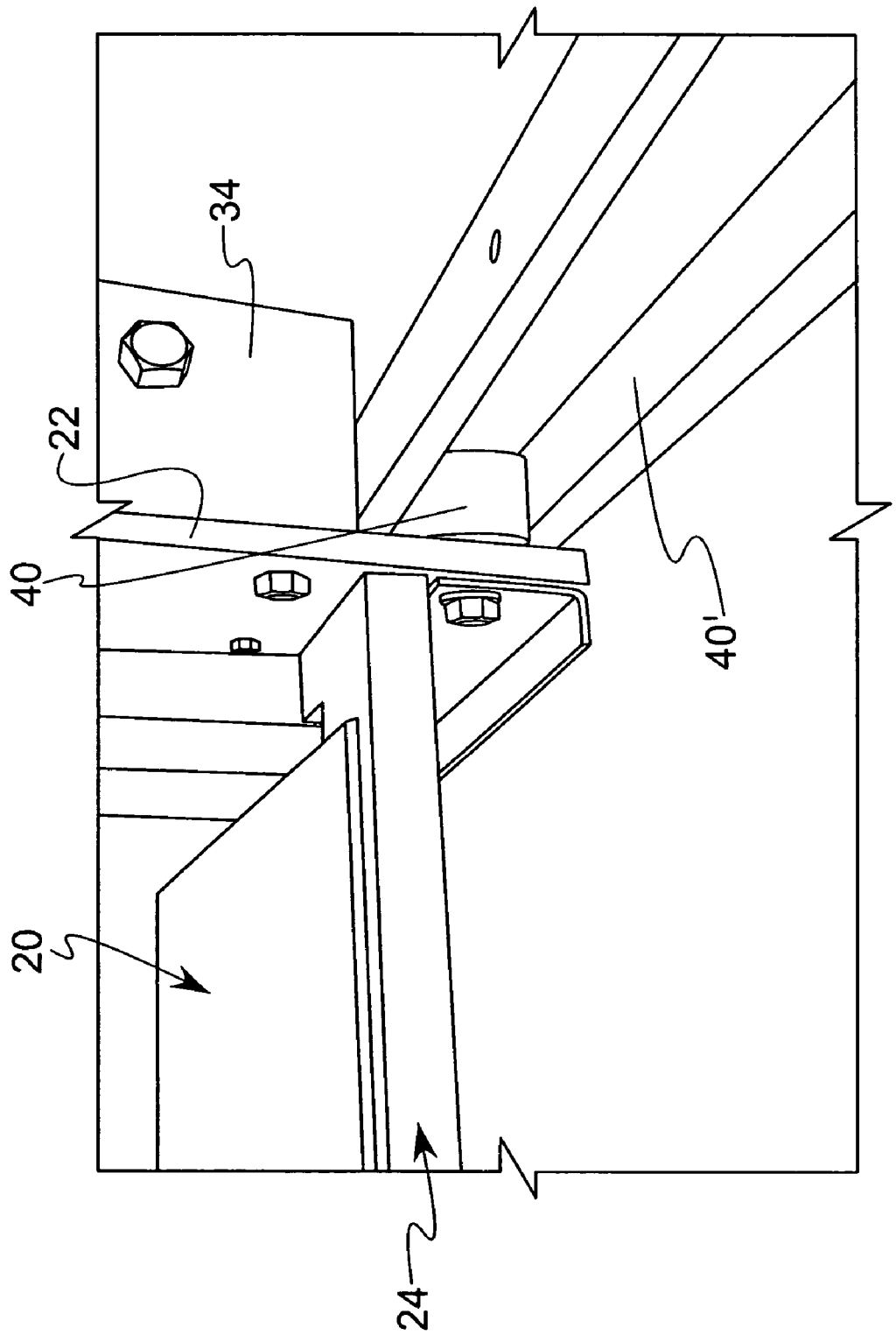
FIG. 2 is an end view in perspective illustrating a vertical support roller.

The carriage 20 has vertical support rollers 40 and 42, as shown in FIGS. 1 and 2. These rollers 40 and 42 are preferably made of a low friction polymer material, such as that sold under the trademark DELRIN, in the shape of circular cylinders rotatably mounted on horizontal axes. The rollers 40 and 42 preferably extend laterally outwardly from the front end 26 of the carriage 20 into channels 40' and 42', respectively, formed in the top edge of the frame 12 of the machine 10. The weight of the carriage 20 and its contents thus rests upon the rollers 40 and 42.

Figure 3:
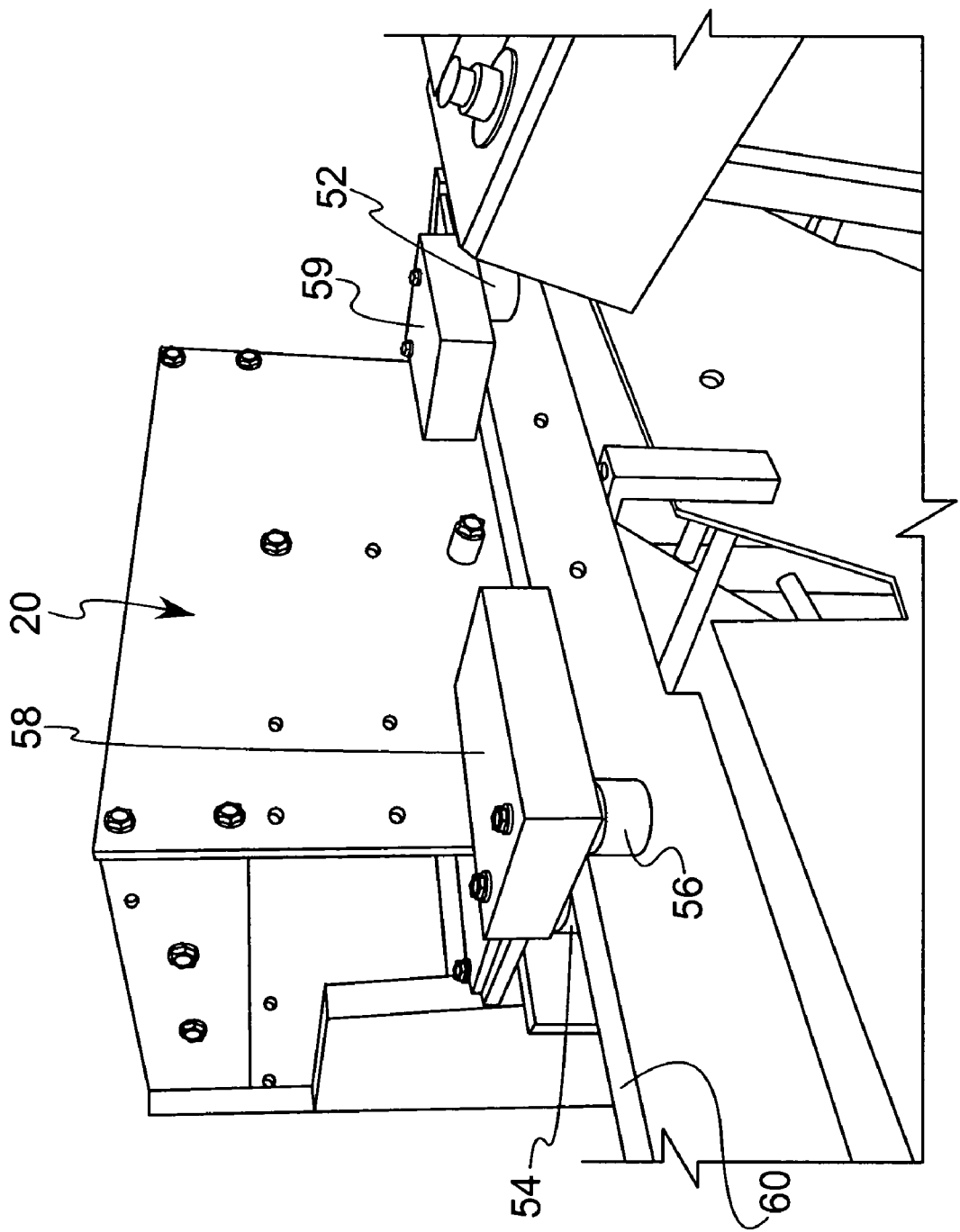
FIG. 3 is a side view in perspective illustrating the horizontal support rollers.
Figure 4:
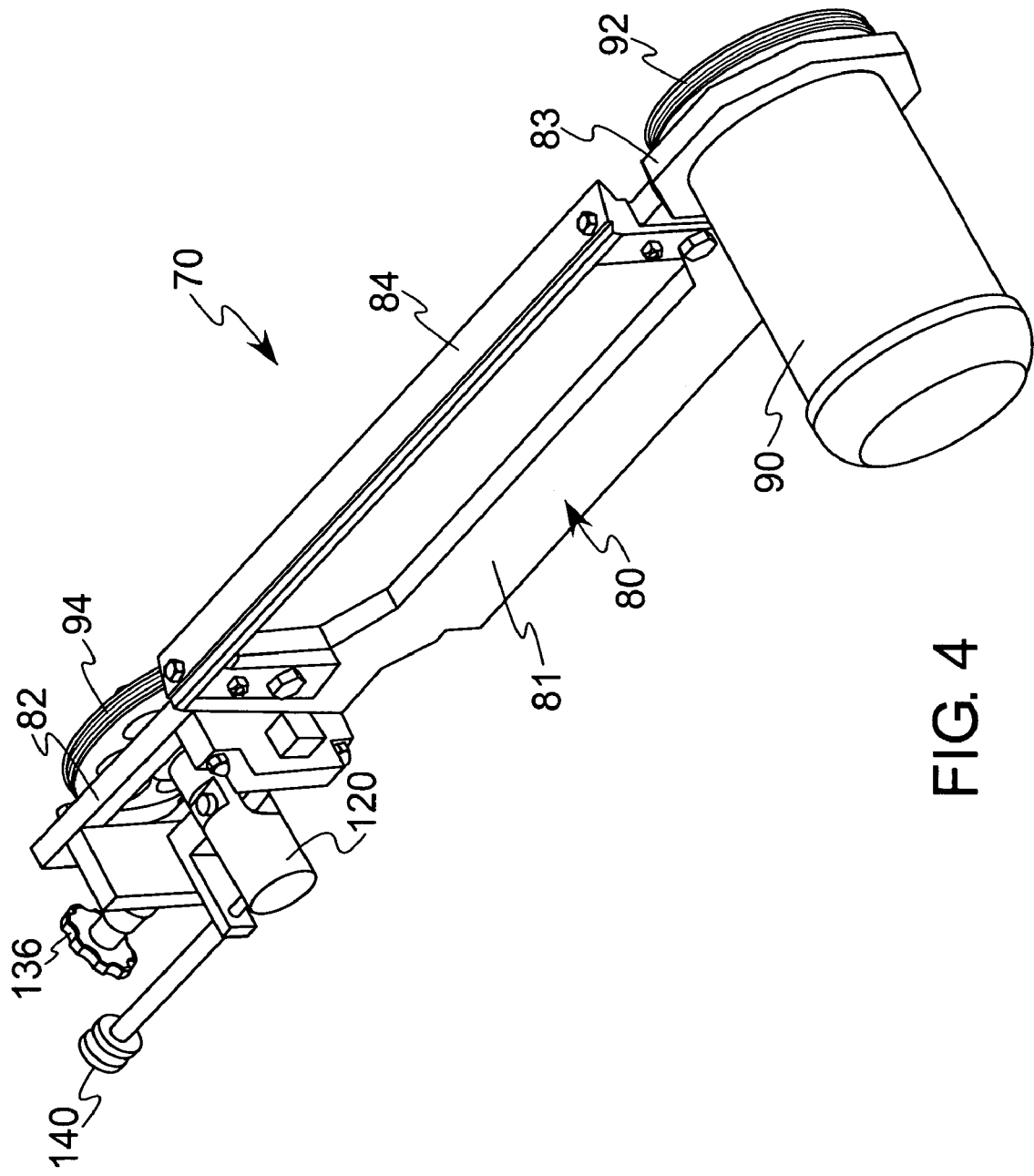
FIG. 4 is a side view in perspective illustrating the slicing apparatus.
Figure 5:
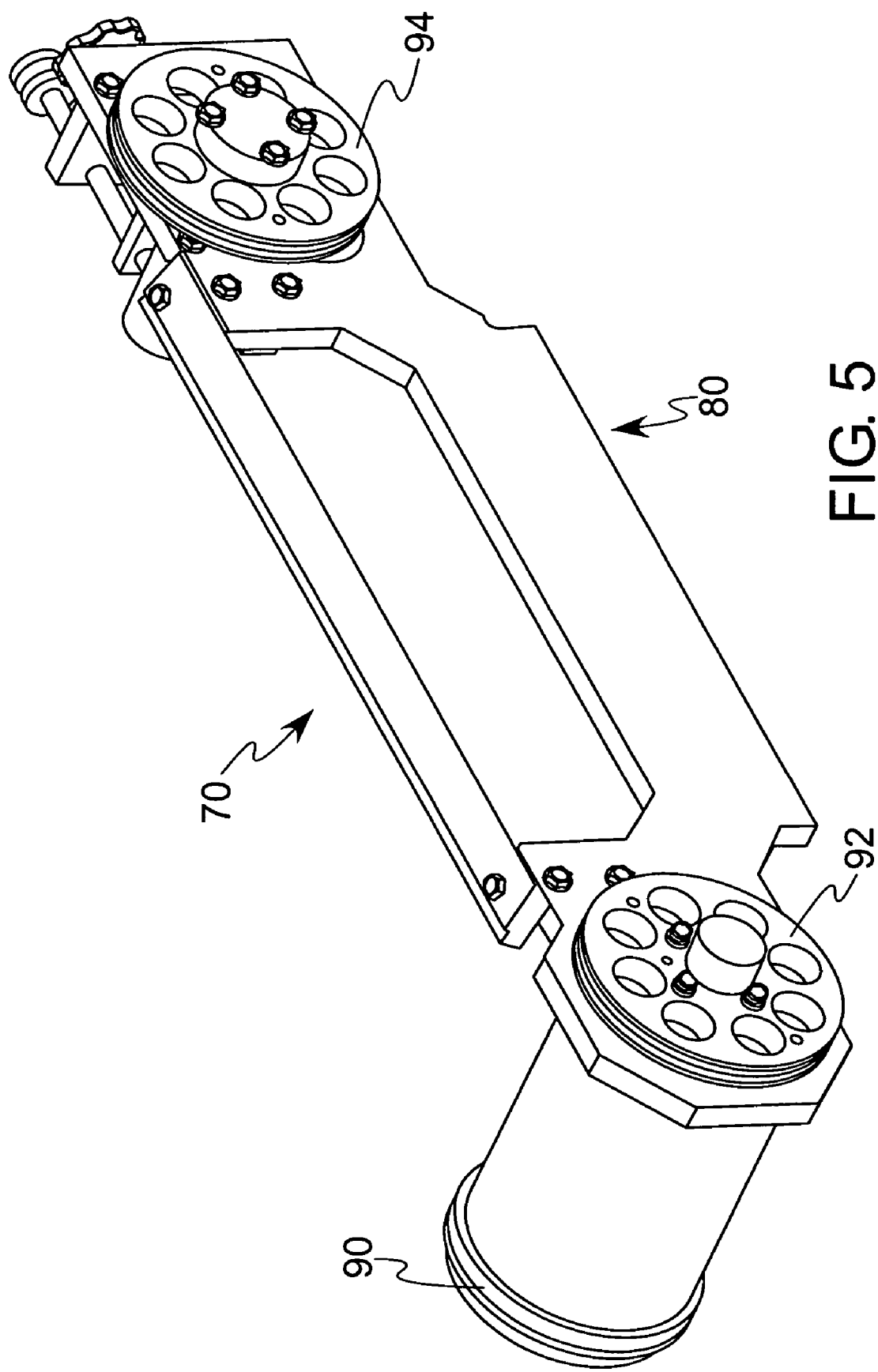
FIG. 5 is a side view in perspective illustrating the slicing apparatus.

The carriage 20 also has horizontal support rollers 50, 52, 54 and 56, as shown in FIGS. 1 and 3, that mount on the side of the carriage 20 opposite the motor 30 near the front and the back ends of the carriage 20. Of course, horizontal rollers could be mounted on any side of the carriage 20 at any position along the length thereof. A pair of blocks 58 and 59 extend laterally from the carriage 20, and the rollers 50, 52, 54 and 56 extend downwardly from the blocks 58 and 59 in pairs on opposing sides of the rib 60, which is part of the frame 12. The rollers 50, 52, 54 and 56 are preferably made of low friction polymer material rotatably mounted on vertical axes to permit longitudinal movement of the carriage 20 through its reciprocation path, but prevent excessive lateral movement of the carriage 20 that would otherwise be caused by the force applied by the motor 30. Because the motor 30 applies its force to one side of the carriage 20, a torque is applied, and the horizontal rollers 50, 52, 54 and 56 reduce the effect this torque has on the path the carriage 20 follows. Thus, the carriage 20 is supported vertically by the rollers 40 and 42, and horizontally by the rollers 50, 52, 54 and 56 as it is reciprocated through its cycle by the motor 30. A position sensor, such as the sensor 51 shown in FIG. 1, can be mounted in the path of the carriage 20 to sense whether the carriage 20 has begun to exceed its normal range of movement. However, such a sensor is not required with the motor 30.

The carriage 20 is preferably mounted directly above a slicing apparatus that has a slicing blade 95 in close proximity to the lower ends of the food products clustered in the carriage 20. The preferred slicing apparatus 70 is illustrated in FIGS. 4-7, and has a bearing plate 80 that is generally U-shaped. The bearing plate 80 has a first leg 82 and a second leg 83 joined together by a base 81. The base 81 is preferably integral with the legs 82 and 83, making the bearing plate 80 a single plate, preferably made of steel, but this is not critical to the operation of the bearing plate 80.

A rotary motor, such as the electric motor 90, is mounted to the leg 83, and a pulley 92 is drivingly linked to the motor 90. The pulley 92 is a conventional pulley on which a conventional band blade can be mounted in a conventional manner so that the band blade can be driven in the manner of a band saw to cut products, such as food logs.

Another pulley 94 is mounted to the opposite leg 82, and the pulley 94 is preferably not motorized. Instead, the pulley 94 is an "idler" pulley of a conventional kind around which the band blade is mounted in a conventional manner. When the motor 90 is activated, it drives the band blade extending around the pulley 92, and the band blade drives the pulley 94 to keep the band blade aligned on the slicing apparatus 70.

Figure 9:
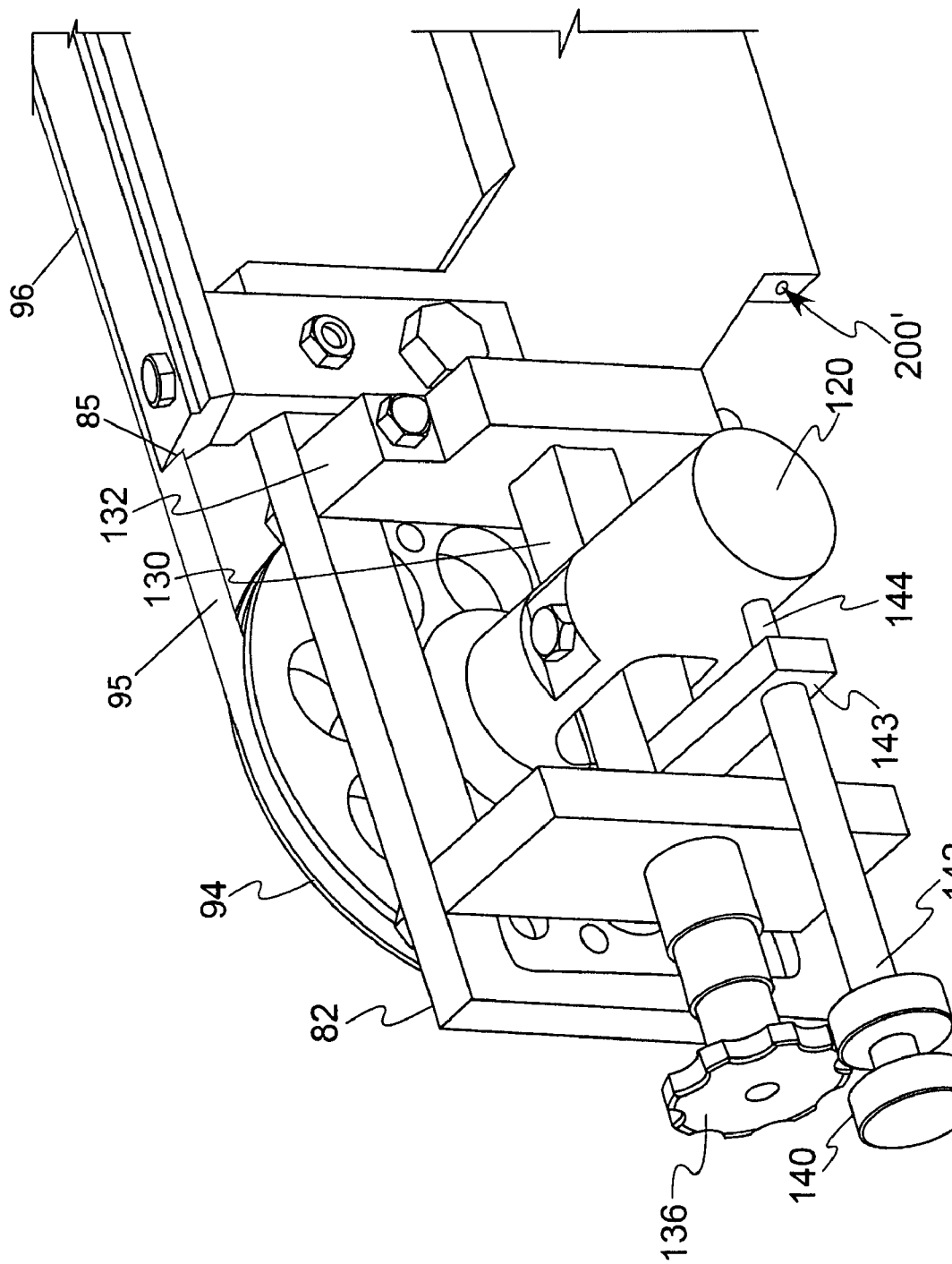
FIG. 9 is a close-up view illustrating the band blade adjustment mechanism.

The blade guide 84 is mounted at the upper ends (in the configuration shown in FIG. 4) of the legs 82 and 83 of the bearing plate 80 by adjusting mechanisms and has a slot 85 (see FIG. 9) through which the blade extends. The adjusting mechanisms include the first finger 102 and the second finger 104 (see FIG. 7) that extend downwardly (in the illustration of FIG. 7) from rigid attachment to opposite ends of the blade guide 84 and attach to the legs 82 and 83, respectively. The blade 95 is provided with a cutting edge 96 that is the only portion that projects outwardly from the blade guide 84. The blade guide 84 commonly varies slightly from being perfectly flat or straight, and therefore it must be bent slightly in one direction or the other in order to be straightened. This is accomplished by the adjusting mechanism that includes the fingers 102 and 104 and the means of attaching the fingers 102 and 104 to the bearing plate 80, as described immediately below.

Figure 8:
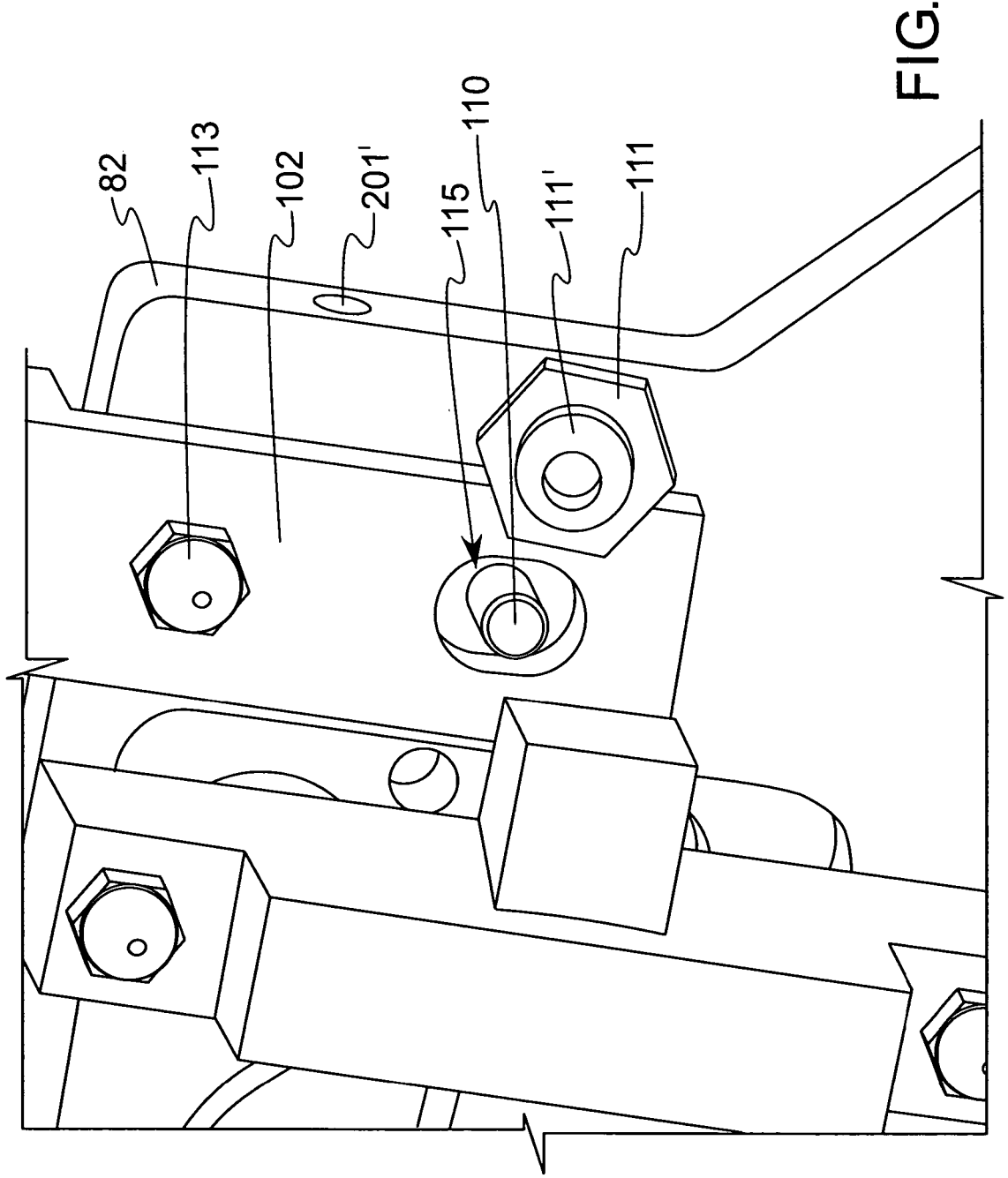
FIG. 8 is a close-up view illustrating the blade guide adjustment mechanism.

As shown in FIG. 6, the finger 102 mounts to the leg 82 by two shafts 110 and 112 that extend between the finger 102 and the leg 82. The shaft 110 and the shaft 112 extend through apertures (not shown) of similar size in the leg 82 and into apertures in the finger 102 (see FIG. 8). The shaft 112 is preferably threaded and has a hex head on one end, and can be, for example, a machine screw. The threaded end of the shaft 112 extends through a slightly elongated aperture of similar size in the finger 102 and a nut 113 mounts on the end thereof (see FIG. 8). The aperture's shape permits slight vertical (in the orientation shown in FIG. 6) adjustment in order to adjust the position of the blade guide 84.

The shaft 110, which can be referred to as the adjustment shaft, is preferably also the threaded shaft of a machine screw that extends through the bearing plate 80 into an aperture 115 (see FIG. 8) in the finger 102 that is substantially larger than the shaft 110, and is preferably elliptically shaped. The cam nut 111 has a hex head to permit rotation of the cam nut 111 using a wrench, and a lobe 111' that is offset substantially from the axis of the aperture that extends through the cam nut 111 into which the shaft 110 extends. The lobe 111', upon rotation of the cam nut 111 about the shaft 110, has a radially outwardly facing surface that traverses a path having a larger diameter than the lobe 111'. This path's diameter is equal to twice the distance between the radially outwardly facing surface and the axis of the shaft 110. The effect of this feature will now be explained.

The lobe 111' extends into the aperture 115 when the shaft 110 is extended into the preferably threaded aperture of the cam nut 111. Upon rotation of the cam nut 111 relative to the shaft 110, the radially outwardly facing surface of the lobe 111' seats against the sidewall of the aperture 115. Upon further rotation, the lobe, serving as a cam, displaces the sidewall of the aperture 115 in the finger 102, which causes the finger 102 to pivot about the shaft 112. The shaft 112 thereby forms a pivot. Rotation of the cam nut 111 thus applies a lateral force to the finger 102, and, thereby, applies a torsion force to the end of the blade guide 84 in order to bend the blade guide 84 as desired. The finger 102 preferably has a V-shaped underside where it comes very close to contacting the leg 82 (see FIG. 6). This gap (which can be approximately 0.002 inch wide) and V-shaped underside permit the finger 102 to pivot more easily about the shaft 112, and the gap also permits height adjustment of the blade guide 84.

Another, substantially identical, blade guide adjustment structure is formed at the opposite end of the blade guide 84, as shown in FIGS. 4-7, and the blade guide 84 can thereby be bent from one or both ends to adjust the shape of the blade guide 84. Once the blade guide 84 is straightened as desired, the nut 113 is tightened on the shaft 110, and the shaft 112 is tightened (such as by rotating the hex head on the shaft 112 shown in FIG. 6) while the cam nut 111 is held in place to prevent rotation, so that the blade guide 84 retains its straight shape. The blade guide 84 can be adjusted when the slicing apparatus 70 is mounted to a slicing machine, such as the machine 10 of FIG. 1, or when it is separate from a machine. The band blade extends through a longitudinal slot in the blade guide 84 in a conventional manner.

Figure 10:
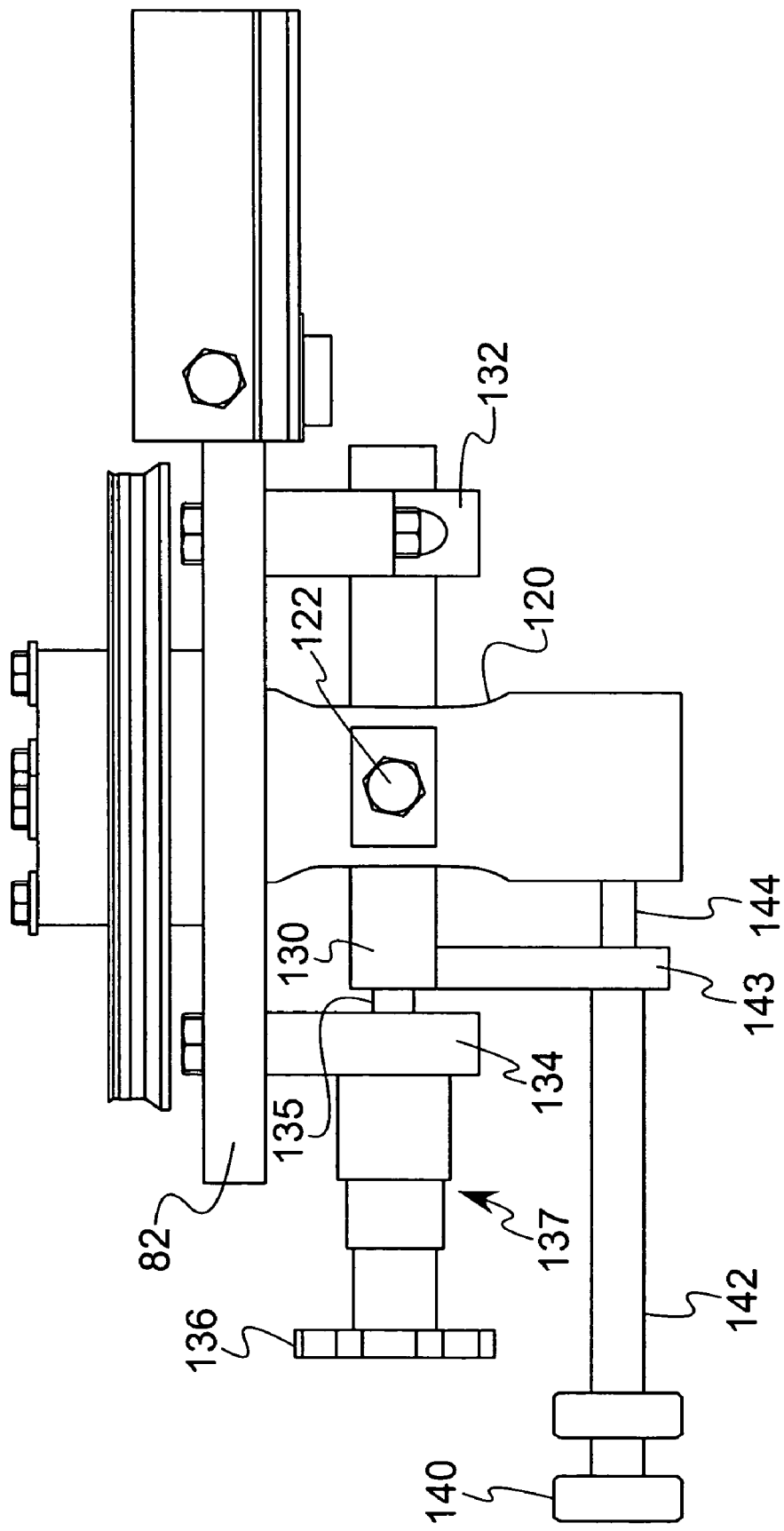
FIG. 10 is a top view illustrating the adjustment mechanism of FIG. 9.

The idler pulley 94 is mounted to the bearing plate 80 by a mechanism that permits adjustments of blade tension and blade tracking, which is the alignment of the blade on the pulleys and in the slot formed in the blade guide 84. The mechanism for adjusting the idler pulley 94 is illustrated most clearly in FIGS. 9 and 10. The leg 82 of the bearing plate 80 has an opening through which the axle 120 extends. The pulley 94 mounts to the axle 120 in a manner that permits substantially unresisted rotation of the pulley 94, such as by using ball bearings or the like. The axle 120 is pivotably mounted to the elongated rod 130 by a screw 122 mounted through aligned apertures (not shown) formed in the axle 120 and the rod 130. The elongated rod 130 extends through an opening through the axle 120, thereby forming a hinge with pivotable motion about the screw 122.

Figure 12:
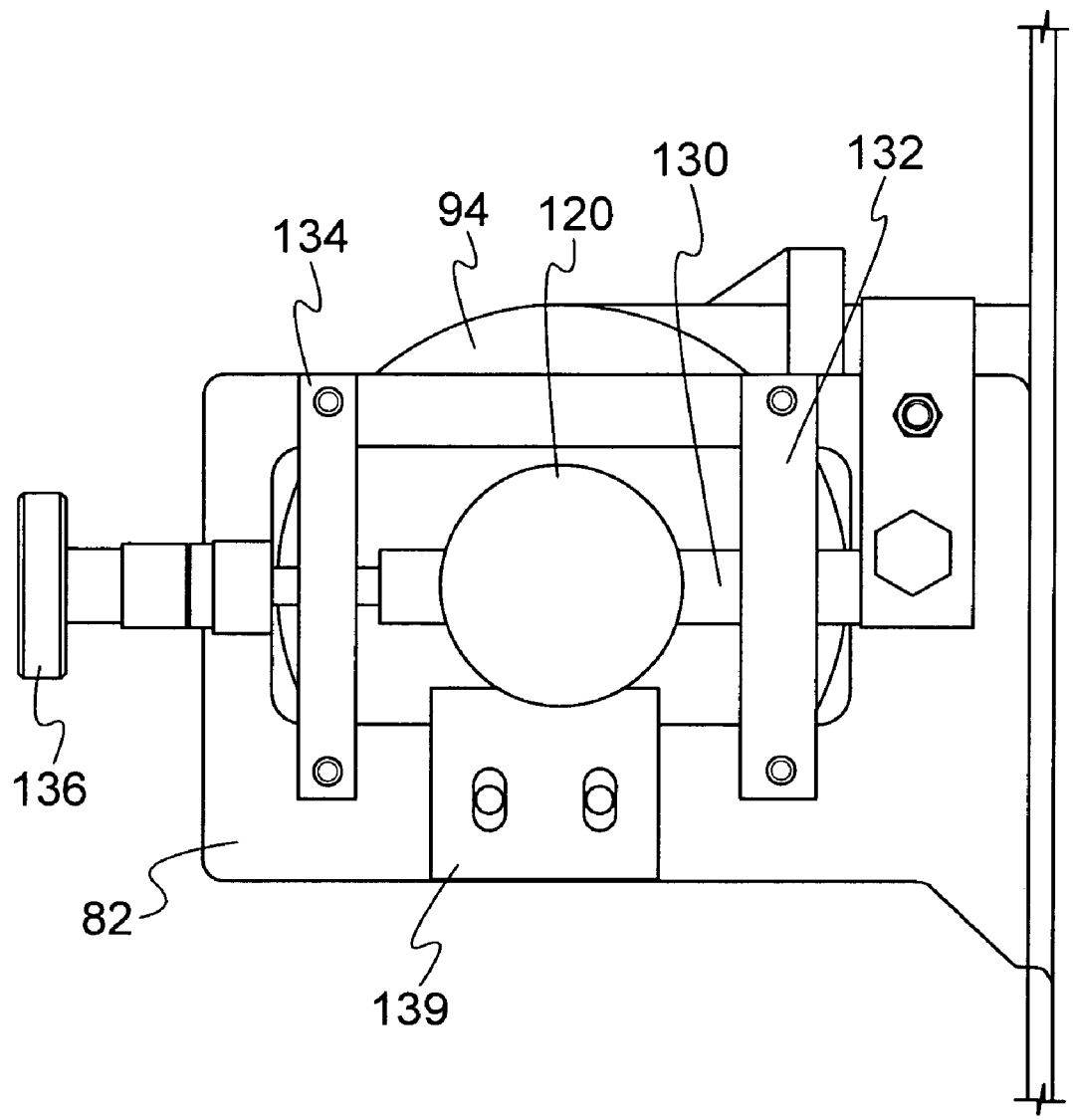
FIG. 12 is an end view illustrating an alternative support for the axle.

The elongated rod 130 extends through a passage formed in the first block 132, which is rigidly mounted to the bearing plate leg 82. The threaded rod 135 is rigidly mounted at one end to the elongated rod 130, and extends through an aperture formed in the second block 134 (see FIG. 10), which is rigidly mounted to the leg 82, and through the hollow cylinder 137 to the handle 136. The hand-grippable handle 136 has a threaded aperture (not shown) that rotatably receives one end of the threaded rod 135, and a bias, such as a coil spring, exerts opposing forces against the handle 136 and the block 134. Thus, upon rotation of the handle 136 in one direction, the threaded rod 135 is received further into the complementary threads formed in the handle 136, thereby displacing the attached elongated rod 130 longitudinally away from the block 132. Upon rotation of the handle 136 in the opposite direction, the elongated rod 130 is displaced longitudinally in the opposite direction toward the block 132. The block 132 is preferably a low friction polymer, such as that sold under the trademark DELRIN, which permits substantially unresisted movement of the elongated rod 130 therethrough in order to adjust the distance between the pulleys 92 and 94, which adjusts the tension of the band blade around the pulleys 92 and 94. The support 139, shown in FIG. 12, can be rigidly attached to the leg 82 beneath the axle 120 and seated against it, to provide structural support to the axle 120.

In addition to adjusting the position of the idler pulley 94 relative to the driven pulley 92, the angle of the pulley 94 can be modified. This is effected by rotating the hand-grippable handle 140. The handle 140 attaches to the cylindrical rod 142, which has a threaded tip 144 that extends through the bar 143. The bar 143 is rigidly mounted to the elongated rod 130. The threaded tip 144 seats against the axle 120, and upon rotation of the handle 140 in one direction, the tip 144 pivots the axle 120 in one direction about the screw 122. Upon rotation of the handle 140 in the opposite direction, the axle 120 pivots in the opposite direction under the bias provided by the band blade, which is under tension. This structure thus permits adjustment of the tracking of the band blade.

Figure 11:
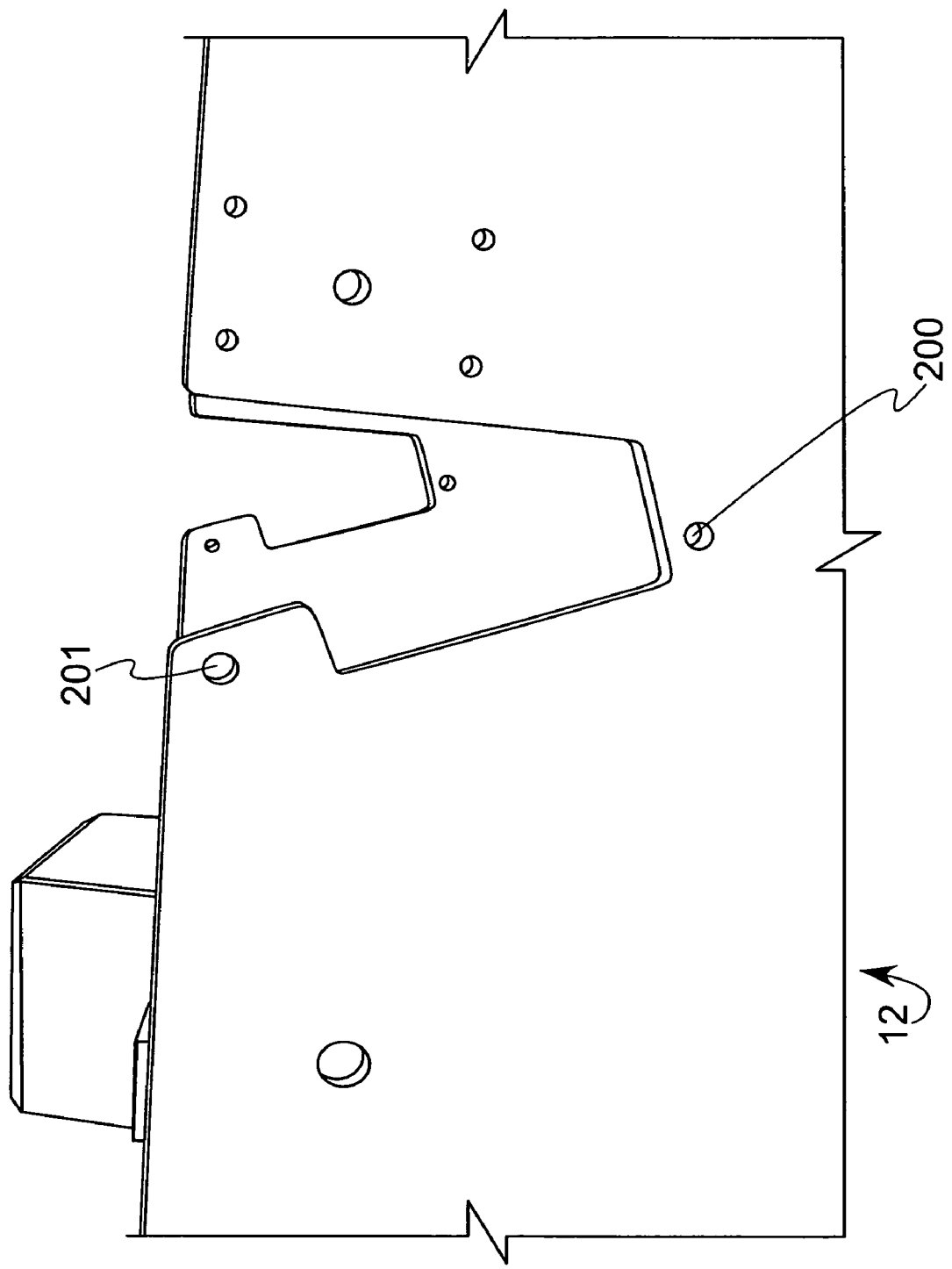
FIG. 11 is a side view illustrating a frame of a food slicing machine that can receive the slicing apparatus.

The slicing apparatus 70, which includes the bearing plate 80, the pulleys 92 and 94, the motor 90, the blade guide 84 and the band blade 95 (see FIG. 9), is preferably removably mounted to the frame 12 of the machine 10. The slicing apparatus 70 is preferably attached by bolts (not shown) that extend through holes 200 and 201 (see FIG. 11) in one sidewall of the frame 12 and into threaded apertures 200' (see FIG. 9) and 201' (see FIG. 8) in the bearing plate 80. This is the fastening means near one end of the bearing plate 80; similar fastening means are used near the opposite end of the bearing plate 80 to attach that leg of the bearing plate 80 to the frame 12. Of course, other fastening means, such as clamps, rivets and pins mounted in aligned holes, can be substituted for the preferred fastening means. Additionally, in one embodiment, a conveyor can be placed through the gap formed between the blade guide 84 and the base 81. In an alternative embodiment, a portion of a pendulum slicer can also pass through that same gap. The orientation of the slicing apparatus 70 is not critical, inasmuch as the slicing apparatus 70 can be mounted in the orientation shown in FIG. 6 (which is considered right side up), it can be mounted upside down, or at any angle in between.

A unique feature of the invention is that the components of the slicing apparatus 70 attach to the bearing plate 80, and not directly to the machine 10. Instead, the components attach to the bearing plate 80, and only the bearing plate 80 attaches to the machine. Therefore, the entire slicing apparatus 70 can be attached to and removed from the machine 10 as a single unit without any need for disassembly of the components of the slicing apparatus 70, and without affecting the relationships between the components of the slicing apparatus 70. For example, the "straightness" of the blade guide 84 can be established prior to attachment of the slicing apparatus 70 to the machine 10. Additionally, the tension and tracking of the blade can be adjusted prior to installation of the slicing apparatus 70 on the machine 10. The slicing apparatus 70 can then be mounted to the machine 10 without modifying these settings.

Another feature of the invention is that it can be disassembled and re-assembled in a mirror image configuration to provide a machine that can work on the opposite side of a conveyor as the originally configured machine.

The slicing apparatus 70, therefore, is a self-contained, operable unit that is the combination of the components that attach to the bearing plate 80 and are attached to and removed from the machine 10 without the need to disassemble the components. This feature makes the slicing apparatus 70 a "modular unit" that can be used in one or more slicing machines that can accommodate it, and this feature avoids the need for different slicing apparatuses in different machines.

While certain preferred embodiments of the present invention have been disclosed in detail, it is to be understood that various modifications may be adopted without departing from the spirit of the invention or scope of the following claims.

The invention claimed is:

1. A modular slicing apparatus comprising:
   (a) a bearing plate having a first leg member joined to a second leg member by a base;
   (b) a rotary motor mounted to one of said leg members;
   (c) a first pulley drivingly linked to the rotary motor;
   (d) a second pulley rotatably mounted to another of said leg members;
   (e) an elongated blade guide mounted at a first end to the first leg member and at a second end to the second leg member, the blade guide having a longitudinal slot for retaining a blade;
   (f) a continuous loop blade extending around the first and second pulleys and through the slot in the blade guide, the blade having an exposed cutting edge, wherein the bearing plate, first and second pulleys, motor, blade and blade guide are connected as an operable unit;
   (g) a first finger member interposed between the first end of the blade guide and the first leg member of the bearing plate;
   (h) a first shaft extending between the first leg member and the first finger member for mounting the first leg member to the first finger member;
   (i) an adjustment shaft extending between the first leg member and the first finger member, the adjustment shaft extending from rigid connection to one of said first members through an aperture in the other of said first members; and
   (j) a cam nut rotatably mounted on said adjustment shaft and having an offset lobe inserted into said aperture, said lobe seating against an aperture sidewall and exerting a force against said sidewall upon rotation of the cam nut about the adjustment shaft for rotating the first finger member about the first shaft.

2. The apparatus in accordance with claim 1, wherein the first shaft and the adjustment shaft are threaded.

3. The apparatus in accordance with claim 2, wherein a pointed surface of the first finger member is disposed adjacent the first leg member to form a gap that, along with the pointed surface, facilitates movement of the first finger member relative to the first leg member.

4. The apparatus in accordance with claim 2, further comprising:
   (a) a second finger member interposed between the second end of the blade guide and the second leg member of the bearing plate;
   (b) a threaded shaft extending between the second leg member and the second finger member for mounting the second leg member to the second finger member;
   (c) an adjustment shaft extending between the second leg member and the second finger member, the adjustment shaft extending from rigid connection to one of said second members through an aperture in the other of said second members; and
   (d) a cam nut rotatably mounted on said adjustment shaft and having an offset lobe inserted into said aperture, said lobe seating against an aperture sidewall and exerting a force against said sidewall upon rotation of the cam nut about the adjustment shaft for rotating the second finger member about the threaded shaft.

5. The apparatus in accordance with claim 4, wherein:
   (a) said second pulley is mounted to an axle that is pivotably mounted to a longitudinally displaceable rod for pivoting the second pulley about a pivot point;
   (b) a block mounted to said bearing plate and having an opening through which said longitudinally displaceable rod extends for limiting lateral movement of said rod;
   (c) means for displacing said longitudinally displaceable rod longitudinally for adjusting blade tension; and
   (d) means for pivoting said axle for adjusting blade tracking.

6. The apparatus in accordance with claim 1, further comprising means for mounting the bearing plate to a food slicing machine.

7. The machine in accordance with claim 6, wherein the first leg, second leg and base of the bearing plate are integral.

* * * * *

UNITED STATES PATENT AND TRADEMARK OFFICE
CERTIFICATE OF CORRECTION

PATENT NO.       : 7,600,459 B2                                             Page 1 of 1
APPLICATION NO.  : 11/231702
DATED            : October 13, 2009
INVENTOR(S)      : Bodey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Fifth Day of October, 2010

David J. Kappos
*Director of the United States Patent and Trademark Office*